United States Patent [19]

Elder

[11] 3,729,681

[45] Apr. 24, 1973

[54] RECEIVER SELECTING ARRANGEMENT

[75] Inventor: James H. Elder, Brookneal, Va.

[73] Assignee: General Electric Company, Lynchburg, Va.

[22] Filed: Aug. 2, 1971

[21] Appl. No.: 168,163

[52] U.S. Cl. ....................................325/304, 325/302

[51] Int. Cl. ....................................................H04b 1/10

[58] Field of Search..........................325/56, 65, 302, 325/304, 305, 306; 328/145, 148, 154

[56] References Cited

UNITED STATES PATENTS 3,628,149 12/1971 Swan ....................................325/304

3,213,370 10/1965 Featherston..........................325/304

*Primary Examiner*—Albert J. Mayer

*Attorney*—James J. Williams et al.

[57] ABSTRACT

In a system having two or more separate radio receivers that can receive signals from a radio transmitter, an arrangement is provided to select the one receiver providing the best signal. Each receiver has means to indicate a squelched condition. The selecting arrangement includes a signal quality indicating circuit for each receiver. The signal quality indicating circuit is supplied with a signal from the receiver when the respective receiver is in an unsquelched condition. The signal quality indicating circuits are connected together, and the best quality signals, as indicated by the highest degree of noise quieting, is selected and utilized as desired.

6 Claims, 7 Drawing Figures

RECEIVER SELECTING ARRANGEMENT

BACKGROUND OF THE INVENTION

My invention relates to an improved receiver selecting arrangement, and particularly to such an arrangement for selecting, from a plurality of receivers, the one receiver which provides the highest quality signal.

In some radio communication systems, two or more radio receivers are provided at separate locations so as to provide two or more receivers that are capable of picking up transmissions from a radio transmitter. The receiver output signals are connected by a communication link, such as a telephone line, to a common location where the best signal is selected for utilization. For example, in a mobile radio communication system in a large city, radio receivers are provided at selected strategic locations so that at least one receiver can receive transmissions from a radio transmitter located anywhere in the city. In such an example, the radio transmitter may be a mobile unit, such as in an automobile, or may be carried by a person, such as by a police officer. As the location of the radio transmitter varies, its signal, as received by each receiver, varies in quality or strength, or both. It is usually preferable that only the one best received signal, as measured by some standard, be used at any one time. Therefore, some arrangement is needed for selecting the one best received signal in such a radio communication system.

Accordingly, an object of my invention is to provide a new and improved arrangement for selecting the one best signal from a plurality of radio receivers.

Systems or arrangements for selecting the best signal from a plurality of radio receivers are known in the prior art, as exemplified by U.S. Pat. Nos. 3,403,341 and 3,495,175. In addition, there have been a number of other prior-art systems for selecting a receiver from a plurality of receivers. These prior-art systems have had various disadvantages, some of which are: a selecting arrangement which makes an irrevocable selection at the beginning of a radio transmission, even though the selected receiver may subsequently provide a poor signal; a selecting arrangement which requires a wire line capable of carrying direct current from each receiver to the common location at which the selection is made; a selecting arrangement which uses signals indicated by audible tones which are coded to indicate the best signals, but which must be filtered to avoid interference with the signals; a selecting arrangement which is relatively slow in operation so that some signals may be lost; and a selecting arrangement which, although giving good indications of the best received signals, is relatively complex.

Accordingly, another object of my invention is to provide a new receiver selecting arrangement that overcomes many of these enumerated prior-art disadvantages.

Another object of my invention is to provide an improved receiver selecting arrangement which is continuous in operation so that a first selected receiver can be subsequently replaced by a second receiver which produces a better signal during the same transmission.

Another object of my invention is to provide an improved receiver selecting arrangement which can operate over connecting lines that can carry only a limited bandwidth of alternating current signals or over connecting lines which carry direct current.

Another object of my invention is to provide an improved receiver selecting arrangement which is relatively fast in operation so that no transmission is lost.

Another object of my invention is to provide an improved receiver selecting arrangement which can be used with many different types of radio receivers.

Another object of my invention is to provide an improved receiver selecting arrangement which does not make a selection based on an erroneously quiet connecting line resulting from an open or short-circuited condition.

Another object of my invention is to provide an improved receiver selecting arrangement which does not require tones outside the bandwidth of a conventional telephone line, and which does not require a filter for the tones used.

Another object of my invention is to provide an improved receiver selecting arrangement which can be used with as many receivers as may be desired.

SUMMARY OF THE INVENTION

Briefly, these and other objects are achieved in accordance with my invention in a system that has a plurality of separate radio receivers. Each receiver includes means for respectively indicating a squelched condition, and each receiver has its signal output connected to a common location. My improved selecting arrangement is provided for each receiver at the common location, and comprises signal input means for connection to the lines leading to the respective receiver. A first gate is connected to the signal input means for passing signals from the signal input means in response to an unsquelched condition of the respective receiver and for blocking signals from the signal input means in response to a squelched condition of the respective receiver. A signal quality indicating circuit is connected to the first gate for evaluating signals passed by the first gate in response to the unsquelched condition of the respective receiver. The signal quality indicating circuit is adapted to be connected to the other signal quality indicating circuits for the other receivers. A second gate is connected to the first gate for further passing the signals passed by the first gate in response to the signal quality indicating circuit indicating that its signals have a quality superior to the signals evaluated by the other signal quality indicating circuits in the system.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

In the following description, I will first give background information and a general description of my selecting arrangement in connection with FIGS. 1, 2, 3, and 4. Then, I will give a detailed explanation of my selecting arrangement as shown in the schematic diagram of FIGS. 5(*a*), 5(*b*), and 5(*c*).

BACKGROUND INFORMATION AND GENERAL DESCRIPTION

Figure 1:
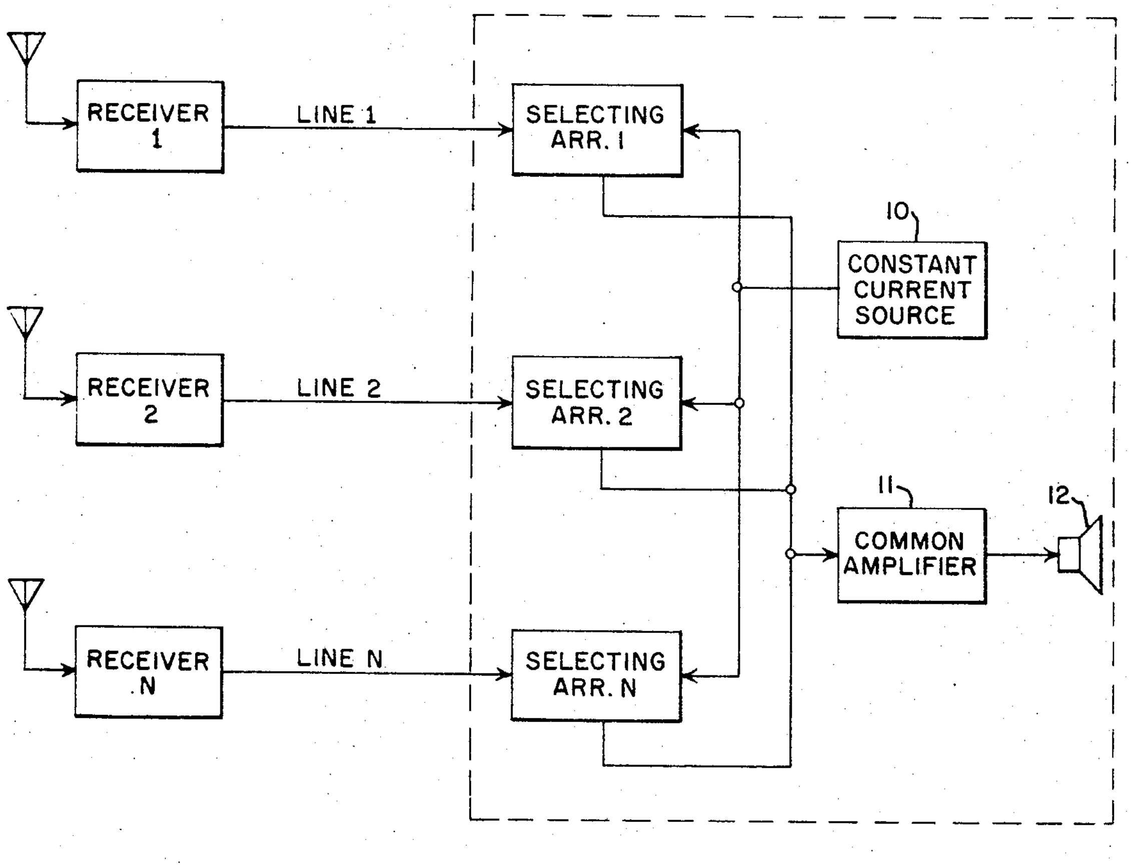
FIG. 1 shows a block diagram of a communication system having a plurality of receivers which are connected to a common location for selection.

In FIG. 1, I show a communication system utilizing three radio receivers, with the last receiver indicated by the letter N to indicate that any number of receivers may be used and a selection made from that number. In a typical system, frequency modulation (fm) is used. The system receivers are positioned at selected, spaced locations, so that for a given radio transmitter (which may have a variable location in an automobile, or carried by a person), preferably two or more of the receivers will receive a signal from that radio transmitter. Each of the receivers is connected over a communication link, which typically is a telephone line, to a common location. The common location is indicated by the dashed line rectangle in FIG. 1. Each receiver is provided with a selecting arrangement which, in accordance with my invention, may accept constant current from a common source 10. The selecting arrangements have a signal quality indicating circuit which produces a signal indicative of the quality of the signal received from its respective receiver over its respective line. These indicative signals are compared through use of the constant current, and the signal indicative of the best quality is passed by the respective selecting arrangement to a utilization device, which typically is an amplifier 11 and a loudspeaker 12. The signal provided by the loud-speaker 12 thus is the best signal received at any given time, and if conditions change so that a particular receiver provides a better signal, then the selecting arrangement selects that signal. FIG. 1 is provided simply to show a typical application for my invention and to provide some background for an understanding of my invention.

Figure 2:
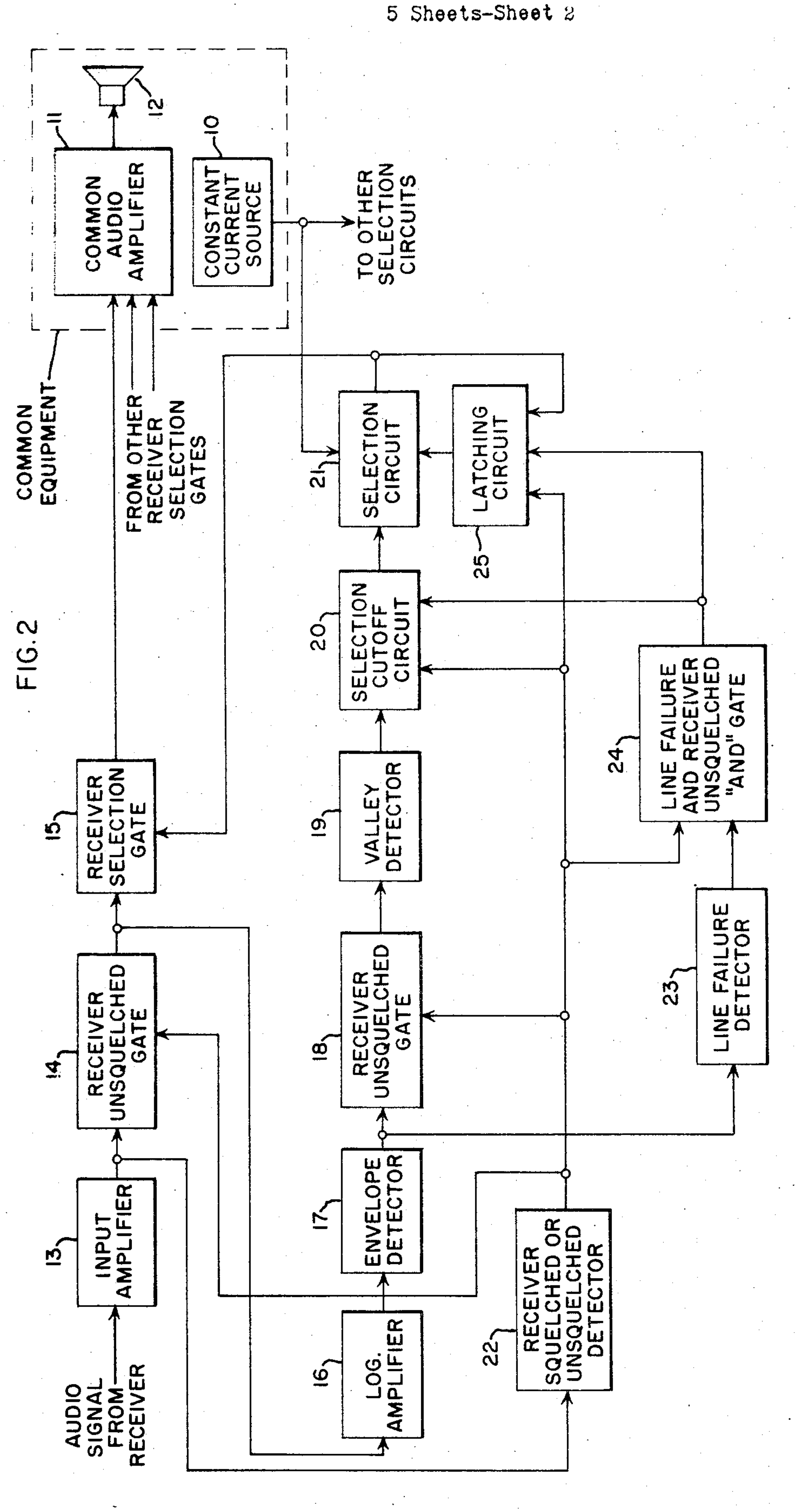
FIG. 2 shows a block diagram of a selecting arrangement in accordance with my invention for use in the system of FIG. 1.

A block diagram of one of the selecting arrangements of FIG. 1 is shown in FIG. 2. The common equipment, namely the amplifier 11, the loudspeaker 12, and the constant current source 10, are also shown in FIG. 2, so that the operation of my invention with the common equipment can be understood. The audio signals from the receiver are supplied over a line (not shown) to an input amplifier 13 which provides sufficient amplification and an impedance match. These audio signals are supplied to a receiver unsquelched gate 14 which permits the audio signals to be applied to a receiver selection gate 15 if the respective receiver is unsquelched, but which blocks the audio signals if the particular receiver is squelched. In accordance with my invention, I propose that each receiver supply a signal to indicate that it is squelched. I prefer that this signal be an audio tone in the vicinity of 1950 Hertz, although other frequencies can be used. This tone can be provided by each receiver in any one of a number of known ways. Squelch circuits are well known in the art, and are commonly used in receivers. Generally, a squelch signal is provided by the receiver in the absence of a detectable carrier, and is used to inhibit noise in the receiver output. This same squelch signal can be utilized to cause the receiver to generate the squelch tone which can be supplied over the receiver line to the input amplifier 13. If the squelch signal is removed, as it would be when the receiver receives a usable signal, then the removal of the squelch signal can also be used to remove the squelch tone. The squelch tone is supplied from the output of the input amplifier 13 to a receiver squelched or unsquelched detector 22. If the tone is present, indicating that the receiver is squelched, the detector 22 provides a signal that causes the receiver unsquelched gate 14 to prevent passage of audio signals. If the tone is absent, indicating that the receiver is unsquelched, the detector 22 provides a signal that opens the receiver unsquelched gate 14 and permits the audio signals to be supplied to the receiver selection gate 15. However, the receiver selection gate 15 does not permit audio signals to pass to the audio amplifier 11 until a quality comparison has been made of all received signals from unsquelched receivers, and only the particular gate 15 associated with the best quality signal will permit the audio signal to pass to the amplifier 11.

Figures 3, 4:
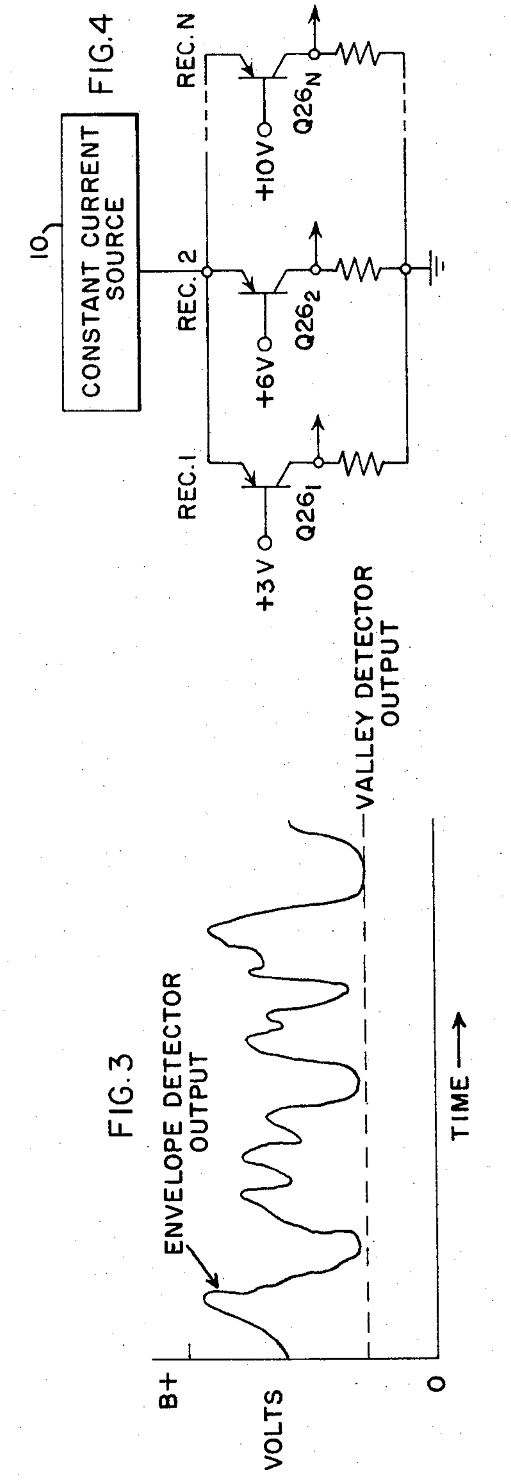
FIG. 3 shows a waveform illustrating the operation of a portion of my selecting arrangement.
FIG. 4 shows a schematic diagram of a circuit that evaluates the signals produced by the plurality of quality-indicating circuits in my selecting arrangement.

The quality indicating circuit of my selecting arrangement is generally included in the six horizontal blocks 16 through 21 in FIG. 2. Signals from the receiver unsquelched gate 14 (passed only if the respective receiver is unsquelched) are connected to a logarithmic amplifier 16 which amplifies input signal in a manner that varies inversely and logarithmically with the input amplitude. In other words, as the input amplitude of applied signals increases, the gain of the amplifier decreases so that for larger inputs the relative increase in output is less than for smaller inputs. The output amplitude bears a logarithmic relationship to the input amplitude. Such a logarithmic amplifier is known in the art, and is provided so as to convert the input voltage amplitudes into a linear function of the amount of noise quieting provided by the respective receiver as measured in decibels (db). Since the decibel is a logarithmic function, the logarithmic amplifier is required. These amplified signals are applied to a positive envelope detector 17 which, as known in the art, provides a positive voltage envelope indicative of the variations of peak amplitude of the audio signals. This envelope signal is applied to a receiver unsquelched gate 18 that permits the envelope signal to pass if the detector 22 indicates that the respective receiver is unsquelched, but that blocks the envelope signal if the detector 22 indicates that the receiver is squelched. Envelope signals passed by the gate 18 are then applied to a valley detector 19 which detects the lowest amplitude (that is, the least positive voltage) that the envelope signals attain. The lowest amplitude attained is a measure of the background noise in the audio signal. And the amount of background noise is a measure of the quality of the received signal. The valley detector 19 has a relatively long time constant (in the order of five seconds) so that its output remains substantially constant between syllables of received speech signals. The envelope detector signals and the valley detector signals are shown in FIG. 3. In FIG. 3, it will be seen that as the valley detector signal becomes lower, this indicates that the background noise is lower, and hence the quality of the received audio signals is better. The valley detector output signal is applied to a selection cutoff circuit 20. The selection cutoff circuit 20 passes the valley detector output signal only if the receiver squelched or unsquelched detector 22 indicates an unsquelched condition, and only if a line failure and receiver unsquelched AND gate 24 provides the proper signal. The AND gate 24 receives a signal from a line failure detector 23 and the detector 22. The detectors 23, 22 must indicate that there is no line failure and that the associated receiver is unsquelched before the selection cutoff circuit 20 passes the valley detector output signal.

The signal passed by the selection cutoff circuit 20 is applied to a selection circuit 21 which is supplied with a constant current from the constant current source 10. FIG. 4 shows a more detailed diagram of three of the selection circuits 21, this diagram being related to FIG. 1 in that the same number of receivers 1 through N are contemplated. Each of the selection circuits 21 utilizes a PNP-type transistor Q26 (followed by a subscript indicating the particular receiver with which the selection circuit 21 is associated). These transistors have their emitters connected to the constant current source 10, which is a suitable direct current source that supplies a constant current, in a preferred embodiment this being one milliampere. The collectors of the transistors are connected through a resistor to the reference potential or ground for the source 10. Each base of the transistor is connected to its respective selection cutoff circuit 20. When the selection cutoff circuit 20 permits the valley detector signal to pass, each of the respective transistor bases is supplied with a valley detector output. In FIG. 4, I have shown the three bases being respectively applied with a +3 volt signal, a +6 volt signal, and a +10 volt signal. In connection with FIG. 3, it will be recalled that this valley detector voltage becomes lower as the audio signal quality improves. In this case, I have assumed that receiver 1 provides the best signal so that its valley detector 19 produces the lowest voltage (namely +3 volts). This lowest voltage causes the transistor $Q26_1$ to conduct more current than the other transistors $Q26_2$ and $Q26_N$. Hence, the emitter of the transistor $Q26_1$ becomes approximately +3.5 volts, taking the emitter-to-base voltage drop into consideration. With the emitter of the transistor $Q26_1$ at approximately +3.5 volts, the other transistors $Q26_2$ and $Q26_N$ are back-biased so that they do not conduct. Hence, the collector of the transistor $Q26_1$ is positive, and this positive signal is applied to the respective receiver selection gate 15 to cause that gate, and that only, to open and pass audio signals from that receiver to the audio amplifier 11.

If, during reception, the audio signal from another receiver becomes better than the assumed case where the receiver 1 provided the best audio signal, then the quality indicating circuit of my invention will permit the audio signals from that receiver to be utilized in the audio amplifier 11. In this connection, I provide a latching circuit 25 so that when a selection is made, a subsequent change in selection will not be made until another audio signal becomes approximately 10 percent better than the audio signal selected. The latching circuit 25 does not latch its selection circuit 21 until the associated detector 22 provides an unsquelched signal, until the associated line failure and receiver unsquelched AND gate 24 supplies a signal, and until its associated selection circuit 21 indicates that a selection has been made.

As mentioned earlier, it is possible that a communication line connecting the receiver to the common location and selecting arrangement can, under some conditions, become open or short-circuited. Under such conditions, the line may become very quiet, and no squelch tone may be supplied, thus indicating that a signal is being received and that its quality is very good when, in fact, no signal at all is being received. The line failure detector 23 receives the positive envelope signals from the envelope detector 17, and if voltage peaks and valleys (indicating an audio signal) are present and have approximately 3 db difference between these peaks and valleys, a signal indicating presence of audio is supplied to the AND gate 24. The AND gate 24 also is supplied with signals from the receiver squelched or unsquelched detector 22. In order for the AND gate 24 to provide a signal that permits the selection cutoff circuit 20 to pass the valley detector output signals, a signal indicating that the receiver is unsquelched (that is, no tone), and a signal indicating presence of audio must be received. If the inputs to the AND gate 24 indicate that tone is received, or that no audio is present, then the AND gate 24 blocks the selection cutoff circuit 20. However, if the line is open or short-circuited so that no tone could be received (falsely indicating an unsquelched condition), then the absence of audio signals would cause the line failure detector 23 to indicate failure. The signal from the AND gate 24 is also applied to the latching circuit 25, and is required in order for the latching circuit 25 to latch the selection circuit 21.

From the general description given above, it will be seen that my invention provides a new and improved receiver selecting arrangement. My selecting arrangement overcomes many of the disadvantages of prior-art arrangements, in that it can make subsequent selections, is relatively fast, can utilize telephone lines that do not carry direct current, and that it does not make a false selection because of an open or short-circuited line. In addition, my selection arrangement can be utilized with almost any number of receivers.

DETAILED DESCRIPTION

Figure 5B:
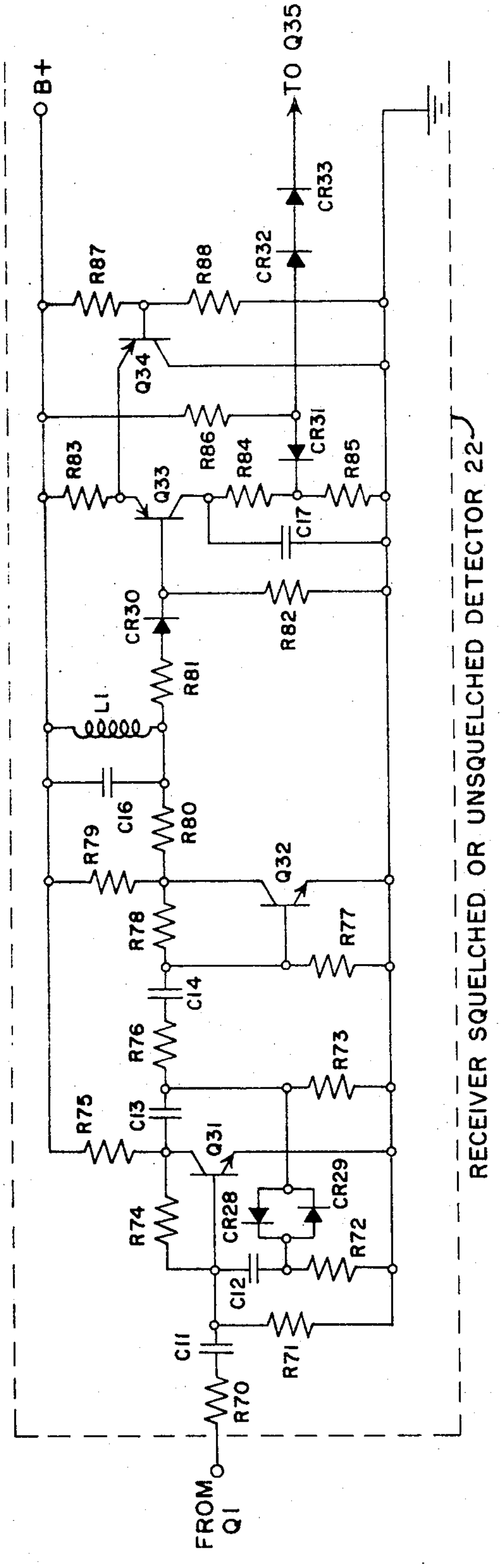
FIGS. 5(*a*), 5(*b*), and 5(*c*) show a complete schematic diagram of my selecting arrangement of FIG. 2.
Figure 5A:
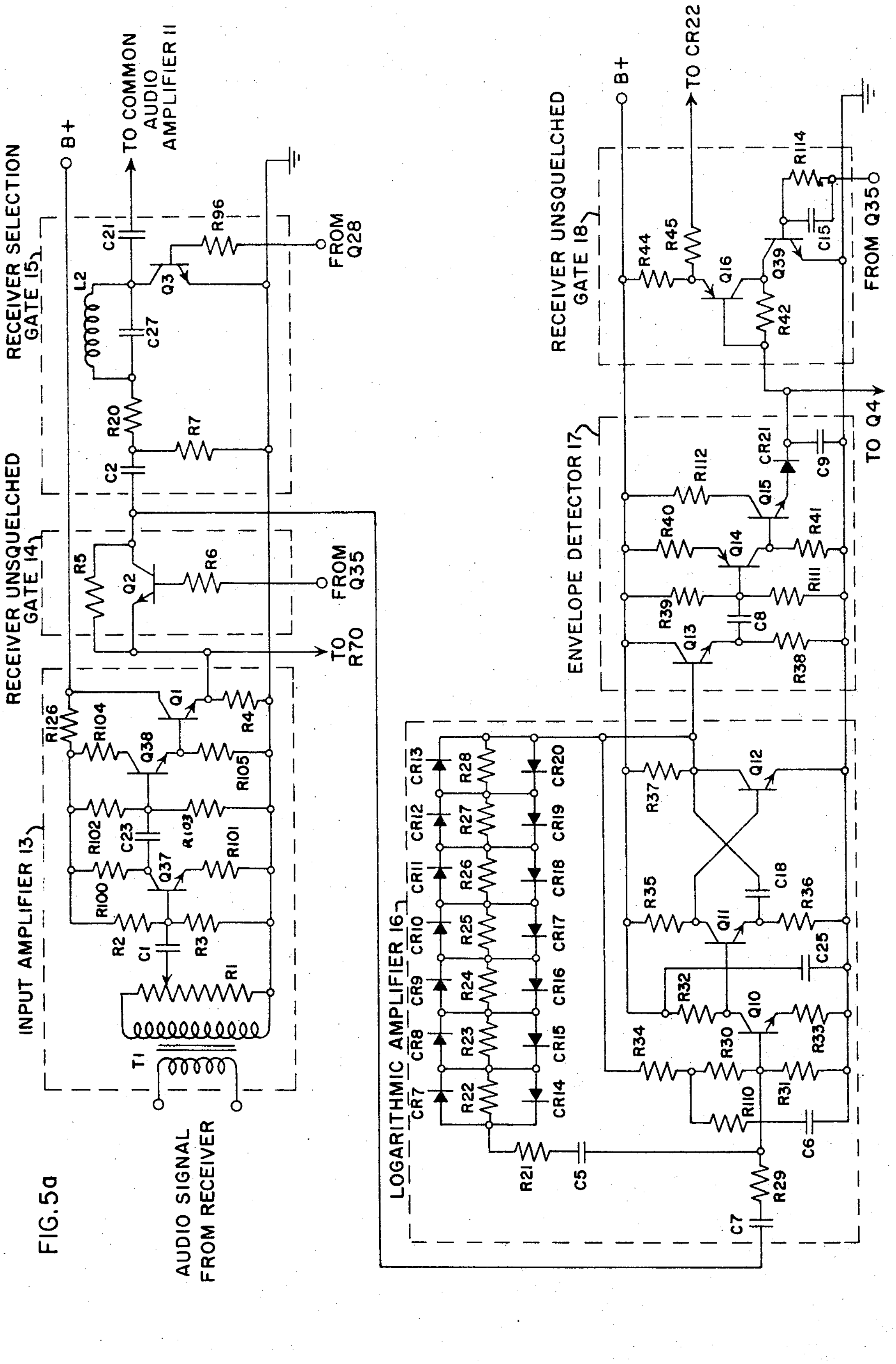
Figure 5C:
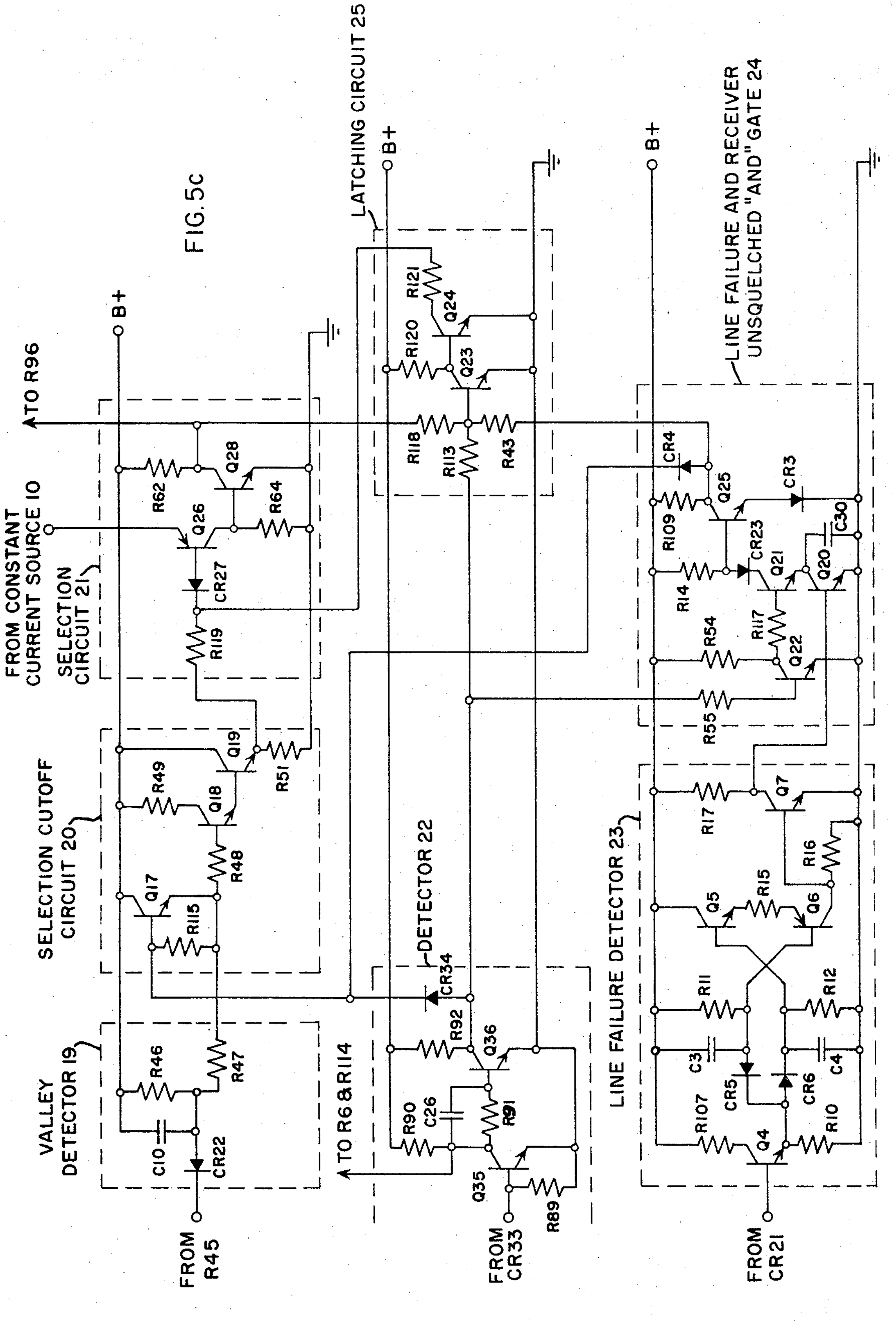

The circuit shown in block diagram form in FIG. 2 has been built and operated in a number of installations. The circuit was operated with a plurality of typical frequency-modulation (FM) receivers, each of which was provided with an oscillator to produce a 1950 Hertz tone when the receiver was squelched. The tone was removed when the receiver was unsquelched, thus indicating reception of a signal transmission. Each receiver was provided with the selection arrangement in accordance with my invention. A detailed schematic diagram of such a selection arrangement is shown in FIGS. 5(*a*), 5(*b*), and 5(*c*). In the consideration of these Figures, FIG. 5(*a*) should be positioned directly above FIG. 5 (*b*); FIG. 5(*c*) should be approximately centered to the right of FIGS. 5(*a*) and 5(*b*); and the Figures connected as indicated. If the FIGURES are arranged in this manner, the various parts of the schematic diagram will be positioned in substantially the same location as the corresponding blocks in FIG. 2. The blocks of FIG. 2 have been indicated in FIGS. 5(*a*), 5(*b*), and 5(*c*) by appropriate dashed line rectangles bearing the same designations and reference numerals. The circuits shown in FIGS. 5(*a*), 5(*b*) and 5(*c*) are supplied with a suitable source of direct current between the indicated terminals B+ and ground.

With respect to the input amplifier 13, the gate 14, and the gate 15, tone or audio signals from the respective receiver are coupled through a line transformer T1, and a level control potentiometer R1 to the resistance-capacitor coupled amplifiers using transistors Q37 and Q38. The potentiometer R1 is provided to permit the line level to be adjusted equally for all receivers. The output from the amplifier 13 is coupled through an emitter-follower transistor Q1 which provides the low impedance required for driving the audio circuits, the logarithmic amplifier 16, and the receiver squelched or unsquelched detector 22. The emitter output from the transistor Q1 is coupled to the gating transistor Q2 in the gate 14. When tone is present, indicating that the respective receiver is squelched, the transistor Q2 is turned off so as to present a high impedance to received signals. When the tone is removed, indicating that the receiver is unsquelched, the transistor Q2 conducts. Audio signals on the collector of the transistor Q2 can then be supplied to the logarithmic amplifier 16, and to a filter comprising the capacitor C27 and the inductor L2. This filter is arranged to provide a high impedance to the tone signals, assumed in this embodiment to be 1950 Hertz. The output of this filter is applied to the collector of the transistor Q3 in the receiver selection gate 15. The operation of the transistor Q3 is controlled by the selection circuit 21. When the audio signal of a particular receiver has not been selected, the transistor Q3 is turned on. This shunts the filter output to ground so that no audio can pass. However, when the audio signal of the receiver has been selected, the transistor Q3 is turned off by the selection circuit 21 so that the selected audio signals can be passed and applied to the common audio amplifier 11. These audio signals are amplified and supplied to the loudspeaker 12 shown in FIGS. 1 and 2.

The receiver squelched or unsquelched detector 22 plays an important part in my invention as this detector 22 does not permit an audio signal to be selected if tone, indicating a squelched receiver, is received. The detector 22 is supplied with input signals from the emitter of the transistor Q1. The detector 22 comprises two amplifier-limiter transistors Q31, Q32; a circuit comprising the capacitor C16 and the inductor L1 tuned to the tone frequency (1950 Hertz); a detector comprising the transistor Q33 and the diodes CR31, CR32, CR33; a regulator comprising the transistor Q34; and an output transistor Q35 and an inverter output transistor Q36. When a receiver is squelched, the 1950 Hertz tone from the emitter of the transistor Q1 is supplied through a blocking capacitor C11 to the amplifier and limiter transistors Q31, Q32. A negative feedback path is provided from the collector of the transistor Q31 through the diode limiters CR28 and CR29 to limit the signal applied to the transistor Q32. The output of the transistor Q32 is derived at its collector and supplied to the tuned circuit comprising the capacitor C16 and the inductor L1. If the 1950 Hertz tone is present, this tone varies the bias on the diode rectifier CR30, which causes the diode CR30 to conduct on the positive half-cycles and to be reverse-biased on the negative half-cycles. When a negative half-cycle turns the diode CR30 off, the transistor Q33 is turned on, and this back-biases the diode rectifier CR31. (The transistor Q34 acts as a regulator for maintaining a constant emitter voltage for the transistor Q33 over the desired temperature range.) With the diode CR31 back-biased, the diodes CR32 and CR33 are biased in a forward direction to turn on the output transistor Q35. When a positive half-cycle biases the diode CR30 in a forward direction, the transistor Q33 is turned off. The capacitor C17 begins to discharge through the resistors R84 and R85 to back-bias the diode CR31 so that the transistor Q35 is kept on. The transistor Q35 remains turned on as long as tone is present, and the transistor Q36 inverts this condition and remains turned off. When tone is absent, the transistor Q35 is turned off and the transistor Q36 is turned on. Operation of the detector circuit 22 can be summarized as follows:

| Tone Present | Tone Absent |
|---|---|
| Zero voltage applied to the transistor Q2 to block gate 14 | Positive voltage applied to the transistor Q2 to open gate 14 |
| Zero voltage applied to the transistor Q39 to block gate 18 | Positive voltage applied to the transistor Q39 to open gate 18 |
| Positive voltage applied to the transistor Q17 to block a selection by the cutoff circuit 20 | Zero voltage applied to the transistor Q17 to enable a selection by the cutoff circuit 20 |
| Positive voltage applied to the transistor Q22 to disable the AND gate 24 | Zero voltage applied to the transistor Q22 to provide one enabling signal to the AND gate 24 |
| Positive voltage applied to the transistor Q23 to block the latching circuit 25 | Zero voltage applied to the transistor Q23 to provide one enabling signal to the latching circuit 25 |

My signal quality indicating circuit is shown in the horizontal blocks at the bottom of FIG. 5(*a*) and at the top of FIG. 5(*c*). These blocks includes the logarithmic amplifier 16, the envelope detector 17, the receiver unsquelched gate 18, the valley detector 19, the selection cut-off circuit 20, and the selection circuit 21. This signal quality indicating circuit measures the quality of the incoming audio signals, and compares all audio signals being provided by receivers in the system. The best quality signal, as determined by my circuit, is selected and applied to the audio amplifier 11 or other utilization device.

The logarithmic amplifier 16 comprises the three transistor Q10, Q11, Q12, which are connected as an operational amplifier with a non-linear, negative feedback network including the diodes CR7 through CR20, and the resistors R21 through R28. This feedback network is non-linear, so that low amplitude signals are amplified more than high amplitude signals. When a receiver is unsquelched and tone is removed, the audio signals from the transistor Q2 in the gate 14 are supplied to the logarithmic amplifier 16 through the blocking capacitor C7 and an input resistor R29. These audio signals at the collector of the transistor Q12 are applied to the negative feedback network. The network is arranged so that each 0.6 volt of the audio signal causes one pair of diodes, beginning with the diodes CR13 and CR20, to conduct. This short-circuits one resistor, beginning with the resistor R28, and thus supplies a small increment of negative feedback. As the amplitude of voltage on the transistor Q12 increases more diodes are rendered conductive to short-circuit more resistors so that more negative feedback is provided. Each resistor value is one half the preceding resistor value so that the increments of feedback are not equal but logarithmically related. Thus, the gain decreases logarithmically with increases in signal level and the decibel value of the applied voltage is converted into a given linear voltage.

Signals from the logarithmic amplifier 16 are applied to the envelope detector 17. This detector 17 comprises two amplifier transistors Q13, Q14, a detector transistor Q15, a diode CR21, a capacitor C9, and a resistor R42 shown in the gate 18. The detector 17 provides a positive voltage which varies in accordance with the envelope of the applied audio signals as shown in FIG. 3. Because of the presence of background noise, this envelope output voltage only goes as low as the noise threshold level present between each syllable or sound in the audio. When the gate 18 is open, it permits the envelope signals to pass, in the absence of a tone as indicated by the table above, from the envelope detector 17 to the valley detector 19. A positive voltage indicating no tone renders the transistor Q39 conductive so that the transistor Q16 can pass the envelope detector signals. The valley detector 19 is an inverted peak detector circuit having a relatively long time constant (in the order of five seconds). The main elements of the valley detector 19 comprise the diode rectifier CR22 and the timing or time constant circuit capacitor C10 and the resistor R46. The lower excursions of the envelope detector output signal cause the transistor Q16 in the gate 18 to conduct. When the transistor Q16 conducts, the diode CR22 is forward-biased to cause the capacitor C10 to charge downward to the lowest voltage provided by the envelope detector output. This voltage is held between syllables or sounds by the relatively large value of the resistor R46 so that the capacitor C10 does not discharge appreciably during that interval. Thus, the output of the valley detector 19 is a direct current voltage that is proportional to the noise level between syllables, as shown by the dashed horizontal line in FIG. 3.

This direct current voltage is applied to the selection cutoff circuit 20. The cutoff circuit 20 permits signals to pass when the transistor Q17 is non-conductive. The transistor Q17 can override the signal quality indicating circuit by disabling the selection circuit 21. When the transistor Q17 conducts, as indicated by a squelched condition of the receiver, or as indicated by a line failure as will be explained, a relatively high positive voltage is applied by its emitter to the base of the transistor Q18. This condition indicates a relatively high valley detector output voltage. Hence, that receiver will not be selected and a selection will be made from some other receiver having a lower valley detector output voltage. The transistors Q18, Q19 supply the valley detector signal to the selection circuit 21. The transistors Q18, Q19 are high-impedance voltage-followers, so that very little of the direct current signal voltage from the valley detector 19 is lost across the resistors R47, R48.

In the selection circuit 21, a voltage-follower transistor Q26 receives this direct current signal. The transistor Q26 is supplied with a constant current source which, as explained in connection with FIG. 4, is connected to each of the signal quality indicating circuits in a system. The best signal, as indicated by the lowest valley detector output voltage, will cause its respective transistor Q26 to conduct more than the other transistors, and thereby back-bias the other transistors Q26. Conduction of the transistor Q26 provides sufficiently positive voltage at its collector to cause the associated transistor Q28 to be turned on. This causes the collector voltage of the transistor Q28 to approach zero. This zero voltage is applied through the resistor R96 (FIG. 5(*a*)) to the base of the transistor Q3 in the receiver selection gate 15. This causes the transistor Q3 to turn off so that audio signals can pass to the amplifier 11 for utilization. This zero voltage is also applied to the base of the transistor Q23 in the latching circuit 25 to provide an additional enabling signal for that circuit 25.

The line failure detector 23 is provided so that a short-circuited or open-circuited line between the receiver and the selecting arrangement does not falsely or erroneously indicate an unsquelched receiver condition with a very quiet transmission line. Without the line failure detector 23, such a line could cause a selection to be made and held, despite the fact that no transmission was actually being received. The line failure detector 23 receives input signals from the diode CR21 in the envelope detector 17 (FIG. 5 *a* ), and these signals are applied to an emitter-follower transistor Q4. The output of the transistor Q4 is applied to a peak and a valley detector including the diode rectifiers CR5, CR6, and associated resistors and capacitors C3, R11 and C4, R12. If an envelope signal having peaks and valleys is received and supplied by the envelope detector 17, the lower terminal of the capacitor C3 becomes less positively charged and the upper terminal of the capacitor C4 becomes positively charged. These charges respectively cause the transistors Q5, Q6 to conduct. Conduction of these transistors Q5, Q6 at the same time supplies a positive voltage to an output transistor Q7. This causes the transistor Q7 to conduct so that its collector voltage approaches and remains at zero as long as there is substantial difference, preferably around 3 db, between the peaks and valleys of the envelope signal. Conversely, if there is no audio signal, or if there is continuous noise or hum, the peak and valley voltages are approximately equal so that the transistors Q5, Q6 cannot conduct. Therefore, transistor Q7 is turned off so that its collector voltage is positive. The collector of the transistor Q7 is connected to one of the AND transistors Q20 in the AND gate 24. The other transistor Q21 in the AND gate 24 is controlled by the transistor Q22, which in turn is connected to the receiver squelched or unsquelched detector 22. If there is tone present, the transistor Q22 conducts and the transistor Q21 is turned off. If there is no tone present, the transistor Q22 is turned off and the transistor Q21 is biased positively. In order for both transistors Q20, Q21 to conduct, there must be a quiet line or a line having continuous noise or hum, and there must be no tone present. With both transistors Q20, Q21 conducting, the base of the transistor Q25 approaches zero, and the transistor Q25 is turned off. With the transistor Q25 turned off, a positive voltage is applied to the transistor Q17 in the selection cutoff circuit 20 to disable that circuit 20 and prevent any valley detector output signals from being utilized for that selecting arrangement. If there is tone present, or if there is audio present, the transistor Q25 is turned on and its collector voltage approaches zero. This permits the selector selection cutoff circuit 20 to function. Voltages from the transistor Q25 are also applied to the base of the transistor Q23 in the latching circuit 25, as will be explained.

The latching circuit 25 is provided to reduce the voltage applied to the associated selection circuit 21 by approximately 10 per cent after a selection is made, and thereby provide a sharp switching action and prevent two selection circuits (whose receivers supply almost equal quality audio signals) from switching back and forth. The latching circuit 25 may be considered to be a three-input OR gate. If any one of its inputs is positive, the latching circuit 25 does not function. If all of its three inputs are near zero, then the latching circuit 25 functions to assist its associated selection circuit 21 to remain latched until an audio signal (sufficiently better to overcome the 10 percent increment) is provided by another receiver. The first input (R113) is derived from the receiver squelched or unsquelched detector 22, and is positive in the presence of squelch tone, and is zero in the absence of tone (which represents an unsquelched condition). The second input (R43) is derived from the AND gate 24, and is positive if there is a line failure and a receiver unsquelched condition, and is zero otherwise. The third input (R118) is derived from the selection circuit 21, and is positive as long as no selection has been made. If the first and second inputs are zero (i.e., no tone and no line failure), and if the selection circuit 21 makes a selection, the transistor Q26 is turned on and the transistor Q28 is also turned on. This causes the transistor Q23 in the latching circuit 25 to be turned off. The transistor Q24 turns on, and provides a further voltage reduction (selected to be about 10 percent) at the base of the transistor Q26, so that the transistor Q26 conducts more. This tends to back-bias the other selection circuits slightly more, and prevents the other circuits from attempting to make a selection when one of the other circuits has an audio signal whose quality is about the same as that of the selected audio signal. However, this is an optional arrangement, and may be eliminated or may be adjusted to provide latching at any desired degree of difference.

CONCLUSION

It will thus be seen that my invention provides a new and improved selecting arrangement for use in a system where a plurality of receivers are arranged to pick up a common radio transmission. While I have shown only one specific embodiment, persons skilled in the art will appreciate that modifications may be made. For example, other devices, such as a separate signalling line, can be connected directly to the detector 22 to indicate the receiver squelched and unsquelched condition. Also, the receiver unsquelched gate 14 could be omitted if the squelch and unsquelch signals can be kept out of the signal quality indicating circuit. Various time constants or time delays may be utilized, as long as they do not cause transmission to be lost. Persons skilled in the art will appreciate that many other modifications may also be made without departing from the true spirit of my invention, which includes the use of a receiver having a squelch tone or signal, and a voice quality indicating circuit which functions in the absence of such a squelch tone. Therefore, while my invention has been described with reference to a particular embodiment, it is to be understood that modifications may be made without departing from the spirit of the invention or from the scope of the claims.

What I claim as new and desire to secure by Letters Patent of the United States is:

1. In a system having a plurality of separate radio receivers, each having means for respectively indicating a squelched condition and an unsquelched condition, and each having its signal output connected to a common location, an improved selecting arrangement for each signal received by a receiver in said system, said selecting arrangement comprising:

a. received signal inputs for respective connection to each of said receiver signal outputs;

b. a detector respectively connected to each of said received signal inputs for providing a squelch signal in response to the respective squelched condition and an unsquelch signal in response to the respective unsquelched condition;

c. a first gate respectively connected to each of said received signal inputs and controlled by a corresponding respective detector for passing received signals from the respective received signal input in response to an unsquelched condition of the respective receiver and for preventing passage of received signals from the respective received signal input in response to a squelched condition of the respective receiver;

d. a signal quality selecting circuit respectively connected to each of said first gates and adapted to be connected to other signal quality selecting circuits in said arrangement for evaluating received signals passed by the respective first gate in response to the unsquelched condition of the respective receiver;

e. and a second gate respectively connected to each of said first gates and controlled by a respective signal quality selecting circuit for further passing received signals in response to the respective signal quality selecting circuit indicating that its received signals have a quality superior to the received signals evaluated by the other signal quality selecting circuits.

2. The improved selecting arrangement of claim 1 and further comprising a line failure and unsquelched gate respectively connected to each of said signal quality selecting circuits and said detectors for blocking the operation of the respective signal quality selecting circuit in response to its respective receiver being unsquelched and in response to the absence of received signals from its respective receiver.

3. An arrangement for selecting the highest quality information signal from one of a plurality of radio receivers arranged to receive a common radio transmission and respectively coupled by a communication link to a common location, said arrangement being located at said common location and comprising:

a. input means respectively coupled to each of said communication links providing respective information signals from each of said receivers;
b. a squelch detector respectively connected to each of said input means for providing squelch signals respectively indicating which of said receivers are in a squelched condition and unsquelch signals respectively indicating which of said receivers are in an unsquelched condition;
c. a common utilization circuit;
d. an information signal path respectively connected between each of said input means and said common utilization circuit, each of said information signal paths comprising an unsquelched gate connected to its respective input means and a selection gate connected from its respective unsquelched gate to said common utilization circuit;
e. means connecting each of said squelch detectors to its respective unsquelched gate for causing said unsquelched gates to block their respective information signal paths in response to a squelch signal and for permitting said unsquelched gates to pass signals through their respective information signal paths in response to said unsquelch signals;
f. a signal quality selector respectively connected between each of said unsquelched gates and its respective selection gate, each of said signal quality selectors producing a selecting signal indicative of the quality of the information signals passed by its respective unsquelched gate;
g. means connected to each of said signal quality selectors for comparing said selecting signals and rendering operative the signal quality selector having a selecting signal indicative of the highest quality information signal;
h. and means respectively connecting each of said signal quality selectors to its respective selection gate for permitting only the information signal path having said highest quality information signal to pass information signals to said common utilization circuit.

4. The arrangement of claim 3, and further comprising a control gate respectively connected to each of said signal quality selectors and squelch detectors for blocking the operation of its respective signal quality selector in response to the presence of an unsquelch signal and in response to the absence of an information signal.

5. An arrangement for selecting the most desired signal from signals provided by a plurality of radio receivers positioned at various locations for receiving a common transmission, said signals being carried by respective communication lines to said arrangement which comprises:

a. an input circuit for each of said signals;
b. a utilization circuit having a respective input for each of said signals and having a common output;
c. an unsquelched gate for each of said signals, each of said unsquelched gates having a signal input connected to a respective one of said input circuits, having a signal output, and having a control;
d. a selection gate for each of said signals, each of each selection gates having a signal input connected to a respective one of said unsquelched gate signal outputs, having a signal output connected to a respective one of said utilization circuit inputs, and having a control;
e. a squelched-unsquelched detector for each of said signals, each of said squelched-unsquelched detectors having a signal input connected to a respective one of said input circuits, and having a control output connected to the corresponding respective one of said unsquelched gate controls for passing signals through said unsquelched gates whose squelched-unsquelched detectors indicate an unsquelched condition;
f. a quality selector for each of said signals, each of said quality selectors having a signal input connected to a respective one of said unsquelched gate signal outputs, and having a control output connected to the corresponding respective one of said selection gate controls;
g. and comparing means connected to each of said quality selectors for causing the quality selector having the best quality signal to open its corresponding respective selection gate and pass signals, previously passed by the corresponding respective unsquelched gate, to its corresponding respective utilization circuit input.

6. The arrangement of claim 5, and further comprising:

a. a line failure detector for each of said signals, each of said line failure detectors being respectively connected to a respective one of said quality selector circuits for indicating the presence or absence of a signal in the corresponding respective quality selector;
b. a line failure and unsquelched gate for each of said signals, each of said line failure and unsquelched gates having inputs connected to a respective one of said line failure detectors and a respective one of said squelched-unsquelched detectors for producing a control signal in response to the absence of a line failure and in response to the presence of an unsquelched condition;
c. and means connecting each of said line failure and unsquelched gates to a respective one of each of said quality selectors for permitting said quality selector circuits to be operative only in response to said control signal.

* * * * *